United States Patent

[11] 3,603,007

| [72] | Inventors | Edwin Naber;<br>Paul Naber, both of Rte. 1, Lake Lillian,<br>Minn. 56253 |
|---|---|---|
| [21] | Appl. No. | 833,520 |
| [22] | Filed | June 16, 1969 |
| [45] | Patented | Sept. 7, 1971 |

[54] ROCK LIFTER
6 Claims, 3 Drawing Figs.

[52] U.S. Cl. .................................................. 37/2,
172/439, 171/63
[51] Int. Cl. .................................................. A01b 43/00,
A01d 33/04
[50] Field of Search ........................................ 171/46, 63,
82; 37/1; 172/429, 449

[56]        References Cited
          UNITED STATES PATENTS

| 2,698,567 | 1/1955 | Vlaich ........................... | 172/439 |
| 2,734,290 | 2/1956 | Tuttle ........................... | 37/2 |
| 2,735,198 | 2/1956 | Zogg et al. ..................... | 37/2 |
| 3,103,076 | 9/1963 | Schultz ......................... | 37/2 |

FOREIGN PATENTS

| 651,390 | 3/1951 | Great Britain ................ | 171/63 |
| 88,845 | 3/1957 | Norway ......................... | 171/63 |

Primary Examiner—Robert E. Pulfrey
Assistant Examiner—C. W. Hanor
Attorney—Schroeder, Siegfried & Ryan ABSTRACT: A rock-lifting apparatus and method of using the same which incorporates the use of a conventional tractor and a conventional three point hitch mounted thereon. The rock-lifting apparatus includes a pair of spaced parallel elongated removable tines which are mounted on a yoke or frame structure with the same being journaled on two of the arms of the conventional three-point hitch which are adapted to be articulated. The yoke structure is further connected to the third arm of the hitch for positioning the tines and the yoke on its mounting relative to the ground. The rock-lifting apparatus and method includes the use of tractor movement to position the tines under the embedded stone to be lifted and operation of the articulated arms of the hitch to perform the lifting function.

PATENTED SEP 7 1971 3,603,007
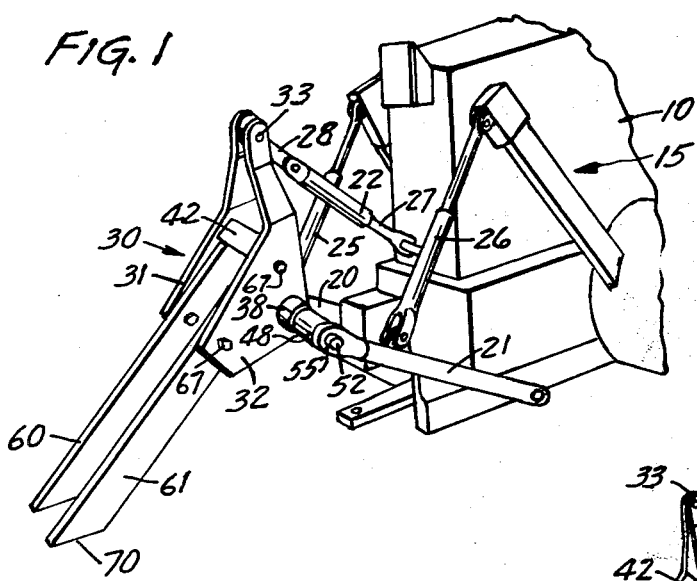
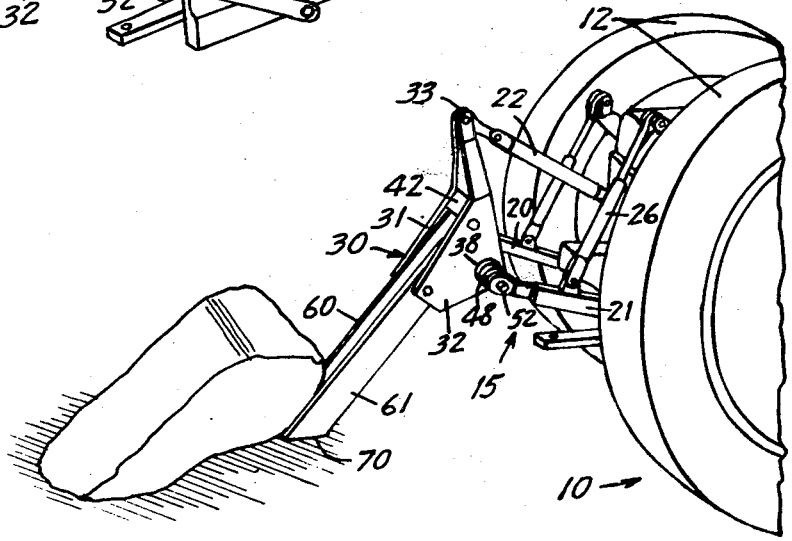
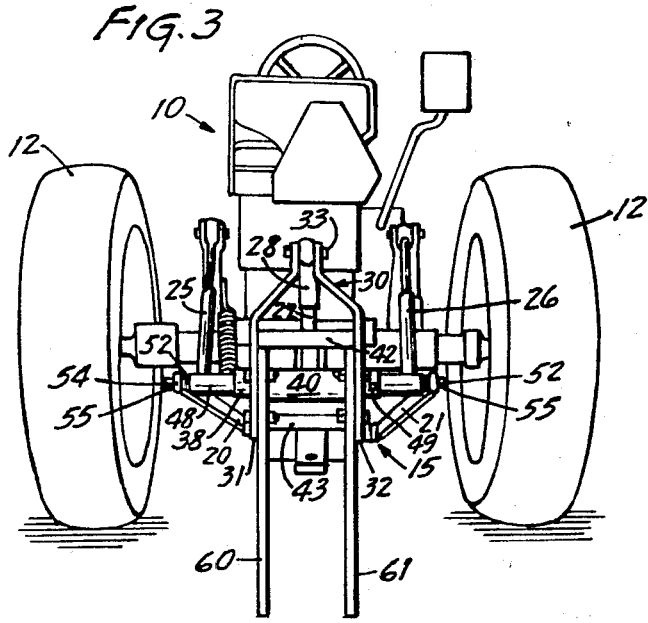
INVENTORS
EDWIN NABER
PAUL NABER
BY
Schroeder, Siegfried & Ryan
ATTORNEYS

ROCK LIFTER

Our invention relates to a method and apparatus for removing rocks from a buried or partially buried location in ground, and more particularly to an improved method and apparatus for removing rocks from an embedded location.

Rock lifting or pulling apparatus for the purpose of clearing land such as for cultivation or building erection purposes is known and in use. Generally such structures employ complicated self-supporting machines disposed over the area to be cleaned and with suitable hook extremities which engage the embedded rock at a point to drag the same along with the apparatus. Attachments have previously been employed for tractors which perform the same function in engaging an embedded rock and pushing it from its embedded location. Such structures require extremely powerful motive sources or tractors to drive or power the same where the rocks are embedded at great depths and are extremely time consuming and difficult to use. Further, the physical apparatus and the positioning of the same limits the size of the object to be moved.

Our invention in an improved rock lifting method and apparatus is directed to the positioning of a pair of spaced parallel earth-penetrating tines relative to the ground and the rock to be lifted so that movement of the tines through a force-imparting means will embed the tines relative to the stone adjacent the same and in a position to lift the embedded stone when the tines are moved upwardly while the force-imparting means continues movement in the penetrating direction. In the apparatus, the tines are supported on a suitable yoke which releasably mounts the tines thereon. The yoke is adapted to be connected to a conventional three-point hitch on a tractor, two of whose articulated arms position the yoke and hence the tines connected thereto. A third arm adjusts the tines in a predetermined angular relationship with respect to the ground to permit ease in penetration to a position beside the rock or stone to be lifted and maintains this relationship with operation of the lifting arms of the hitch to raise the yoke and hence the tines as the tractor is being moved to readily lift the rock from the embedded location. The third arm maintains the angular relationship of the tines with respect to the ground. The force or weight of the rock will be imparted back to the tractor in a direction to increase traction on its wheels insuring full application of force in the lifting direction. This simplified structure is readily mounted on the tractor having a conventional three point hitch and will lift or remove stones for cultivating or building purposes from embedded locations in a ground at a minimum of force requirements, such that smaller tractors may be utilized for this purpose. Further, the apparatus is simple to install and use and is rugged in construction. The operation of the rock lifter in moving the embedded rock or stone positions the same where it may be readily moved to a rock or stone sled for removal from the premises.

Therefore, it is the principal object of this invention to provide an improved method of removing embedded stones or rocks.

Another object of this invention is to provide an improved rock-lifting apparatus.

A still further object of this invention is to provide an improved rock-lifting apparatus as an attachment to a tractor employing a three point hitch and operated with rearward movement of the tractor.

Another object of this invention is to provide an improved rock-lifting apparatus which transmits force from the rock to be lifted onto the motive means or tractor mounting the rock-lifting apparatus to improve traction in the same.

A still further object of this invention is to provide an improved rock-lifting apparatus which transmits force from the rock to be lifted onto the motive means or tractor mounting the rock-lifting apparatus to improve traction in the same.

A still further object of this invention is to provide an improved rock-lifting apparatus which is easy to install, use and maintain.

These and other objects of this invention will become apparent from a reading of the attached description together with the drawings, wherein:

FIG. 1 is a perspective view of the improved rock-lifting apparatus mounted on a conventional three-point hitch of a tractor;

FIG. 2 is a perspective view of the hitch of FIG. 1 in an operative condition; and FIG. 3 is a front elevation view of the hitch of FIG. 1.

Our improved rock-lifting apparatus and the improved method for lifting or removing of embedded rock is shown herein in connection with a tractor-type motive device, indicated generally at 10, on which the improved apparatus is normally mounted and with which the improved method is normally employed. In FIG. 1, such a tractor motive device is shown from the rear or towing end with drive wheels 12 and a conventional three-point hitch, indicated generally at 15, mounted at the transmission or rear extremity of the same. Such a hitch normally employs at least two articulated arms or pivoted levers normally attached to the tractor frame and one linkage arm which may or may not be adjustable. These are indicated at 20, 21 and 22, respectively, in the drawing. The arms 20, 21 are normally pivotally connected to the frame in such a manner as to be disposed at either side of the pivot tongue in the same plane therewith and with the arms being of the same length and normally connecting to a cross brace (not shown). Each of the arms 20, 21 have associated power actuators 25, 26 respectively, associated therewith with one extremity of the actuator being connected directly to the arms and a second extremity being connected to the tractor frame such that by energization of the actuators (normally hydraulic) the arms 20, 21 will pivot simultaneously about their respective mountings on the tractor frame. The linkage or arm 22 may be a turnbuckle-type link or may include a third hydraulic actuator. Either the link or the actuator will be pivotally connected to the tractor frame above the pivot points of the arms 20, 21 and the extent of the same. One extremity of the linkage or actuator connects to the tractor and the other extremity connects to the rock lifter. As will be later noted, the actuator or turnbuckle type linkage is adjustable to cause rotation of the rock lifter to position it relative to the ground. Each of the actuators 25, 26 and that forming arm 22 (where used) are controllably energized from a pneumatic or hydraulic source and through fluid lines controlled by valve means positioned on the tractor frame (not shown). The normal function of such structure is to connect drawn vehicles to a tractor and the two lower arms are articulated for positioning the same relative to a drawn vehicle for ease in coupling the same.

In the present disclosure, the arms 20, 21 mount and carry the structure of the rock lifter, as will be hereinafter described. The main supporting frame for this structure is a U-shaped yoke member, indicated generally at 30, and formed of two side members 31, 32 which are disposed in the greater portion of their general extent in a spaced parallel relationship with the extremities of the same being inwardly bent and connected by a pivot pin 33 to complete the general U-shaped configuration of the same which, from side elevation view, is generally bell crank in form. The straight portions of the sides 31, 32 of this yoke member mount a tubular sleeve 38 which is suitably welded to the sides intermediate their extent with an enlarged tubular portion 40 fitting over the same and between the sides to support the same in spaced relationship and positively connect the sleeve member to the spaced parallel sides of the yoke for supporting the same in pivotal movement. The U-shaped yoke member and the sleeve member are constructed of steel with the sleeve member and its cooperating or encircling spacer 40 being welded to the sides to maintain the shape of the yoke member. In addition, a pair of angle iron spacers 42, 43 are positioned between the sides and parallel to the enlarged spacer portion 40 to provide a solid U-shaped configuration or bifurcated configuration of the yoke member which is connected at its center portion by the support pin 33.

A secondary journaling tube 48 is positioned within the sleeve members 38, 40 and held in position on the same by suitable lock bolts 49 to define a generally tubular journaling surface for the U-shaped yoke member. Positioned within the tubular member 48 is a solid pivot shaft 52 having pin extremities 54 which extend through apertures 55 in the ends of the arms 20, 21 and are bolted therein to rigidly position a shaft 52 between the extremities of the arms 20, 21 and located within the journaling tubular member 48 which forms the journal support for the yoke permitting the yoke to be pivoted about the shaft on an axis defined by the location of the shaft 52 mounted in the ends of the arms 20, 21. Suitable collars (not shown) maintain the spacing of the shaft 52 in the tubular portion 48 of the yoke member so that no translational movement is permitted. This arrangement, number and shape of parts may vary, and the important consideration is to provide a structure which will pivot the yoke on a shaft held between the ends of the articulated arms of the hitch.

The pin extremity of the sides 30, 32 forming the center of the U-shaped yoke member is connected to the cylinder extremity of the actuator forming the arm 22 through a pivot link 28 for the purpose of pivoting the yoke member about the journaling structure formed by the shaft 52 and sleeve 48 to adjust and maintain its angular relationship relative to the ground.

The yoke member 30 mounts a pair of tines 60, 61 which are identical in shape and made of a hardened steel material. They are elongated members generally rectangular in cross section and are mounted on the sides 31, 32 of the yoke member on the inner bifurcated surface of the same, as will be seen in the drawing. The extremity of the tines secured to the yoke member extends above one of the cross brace members 43 and below the second cross brace member 42 and are secured through nut and bolt means 65 at two points to provide a removable mounting for the same. Their general extent is generally aligned with the upper surface of the sides 31, 32 and the lower or free extremity of the tines as a beveled or angled surface, as at 70, which is cut at an angle of approximately 45° to the extent of the respective tines. The tines, as will be hereinafter noted, are adapted to penetrate the earth or ground beside and adjacent embedded rocks or stones to be removed from the soil. In the normal assembled position of the structure, the yoke member is carried by the arms 20, 21 of the hitch through its supporting structure formed by the shaft 52 and tubular portion 48 journaling and positioning the same. Operation of the actuators 25, 26 associated with the arms 20, 21 will be simultaneous and operate to elevate or raise or lower shaft 52 through an arcuate path to raise or lower the tines relative to the earth or surface upon which the tractor is positioned. The linkage 22, which is adjustable in the direction of the extent of the same, will cause the yoke member to pivot about its supporting shaft and move the tines 60, 61 through an arcuate path for the purpose of adjusting and maintaining the position of the tines relative to the soil. Where the linkage is an actuator, it may also be operated to aid in lifting a rock or stone as it approaches the surface.

With the improved rock lifter apparatus, a simplified structure is provided which can be readily connected to the conventional three point hitch of a tractor for mounting and actuation of the same. The tractor is backed into position for rock removal and operated in reverse during removal so that it may be driven forward from the removed rock without encountering obstructions. In the improved method of usage of the rock lifter, hydraulic pressure on the respective actuators 25, 26 is reduced allowing the arms 20, 21 to move to their extended position. The turnbuckle type linkage or actuator 22 is previously adjusted to pivot the yoke structure so that the tines thereof are positioned in an approximately 45° relationship with the ground. The tractor is also positioned relative to the embedded rock to be removed so that the tractor may be backed directly toward the same. As the arms 20, 21 move downward with the tines angled into the earth, no downward pressure is needed on the tines or teeth since backing the tractor toward the rock will draw the teeth into the soil or ground automatically. The tines will thus be forced into a position adjacent the embedded rock such that it is either in contact with the same or adjacent the same and deep in the soil to get under the rock. When the teeth contact the rock, upward pressure is applied by actuation of the actuators 25, 26 which will tend to raise the rock as the tractor is moved backward, while holding the tines in the same angular relationship relative to the ground surface. The rock or weight of the object to be lifted will, at the same time, apply a downward pressure through the yoke structure and supporting arms to the rear tractor wheels for better traction. As the rock moves upward, the linkage 22 will cause the yoke structure to pivot on its support to maintain the angular relationship of the tines with the ground. At the surface level, such rocks though the continued operation of the actuators 25, 26 and rearward movement of the tractor, may be rolled and lifted into an appropriate stone boat (not shown) for removal or hauling away from the particular site. The three point hitch provides a triangular point where application of pressure to the tines will improve the lifting characteristics of the same. The third arm is adjustable for accurately positioning of the tines relative to the embedded rock and makes the structure capable of utilizing the force of the tractor to position the tines relative to the embedded obstacle or rock. The lifting of the tines through operation of the actuators, combined with rearward movement of the tractor, provides that the lifting will be done from below the center of gravity of the rock and will be combined with a rolling action to remove the rock. This apparatus provides an extremely rugged structure and improved leverage for the lifting function. The arrangement of parts of the same eliminates any superstructure over the area in which the rock is to be removed such that the rock lifter will present no obstruction in this sense to the removal of the rock. The individual tines or teeth are removably connected to the supporting frame or U-shaped yoke such as to permit the interchangeability of tines in the event of damage of the same. In addition, they may readily absorb shock of engagement with an embedded stone. Further, the mounting of the tines on the pivoted yoke of the lifter permits the tines to absorb twisting forces imparted by contacting of the rock by a single tine. The improved structure, because of the ability to get to and apply lifting force of the underside of an embedded stone or rock and imparting the force to the tractor to increase traction of the same, permits a much smaller motive source or tractor to be used in the removal of large stones.

What is claimed is:

1. A rocklifter adapted to be connected to the towing end of a tractor having a three-point hitch with at least two articulated arms included therein comprising, a U-shaped yoke member adapted to be mounted on and carried by two articulated arms of the three-point hitch, a plurality of ground penetrating tines each connected at one extremity to the sides of the U-shaped yoke member and extending outwardly therefrom away from a closed center portion of the yoke member, means connected to the yoke member and extending transversely thereto being located intermediate the extent of the yoke member and normal to the extent of the tines, journal means pivotally mounting said last-named means and connected to the ends of said two articulated arms of the hitch for pivotally mounting the yoke member on the hitch, a third arm of the hitch having adjustable means therein, and pivot means connecting a third arm of the hitch to the center portion of the U-shaped yoke member, said third arm being adapted to pivot the yoke member with the tines thereon relative to said two articulated arms to adjust the angular position of the tines relative to a ground surface and said first and second articulated arms being adapted to simultaneously raise and lower the tines with pivotal movement of the arms, said means connected to the yoke member and extending transversely thereto being a sleeve member and said journal means therefor being a tubular pivot member mounted on the ends of the two articulated arms of the hitch and positioned through the sleeve member journaling the same.

2. The rock lifter of claim 1 in which the plurality of ground penetrating tines are a pair of elongated tine members of hardened steel removably connected to the extremities of the U-shaped yoke member to be positioned in spaced parallel relationship and aligned with the general extent of the extremities of the U-shaped yoke member.

3. The rock lifter of claim 2 in which the tines have tapered extremities remote from the connection to the U-shaped yoke member.

4. The rock lifter of claim 1 in which the U-shaped yoke member has a bellcrank configuration with the closed central portion including a pivot pin and with the closed central portion extending at an angle to the extremities and the tine members mounted thereon with the extremities of the yoke member and said tine members being located below the central portion of the U-shaped yoke member when mounted on a tractor.

5. The rock lifter of claim 1 in which the extremities of the yoke member include spacing members positioned therebetween and formed integral therewith.

6. The rocklifter of claim 1 in which the ends of the tubular pivot member mounting the sleeve member with the yoke member thereon define a pivot axis for the yoke member which when connected to the two arms of the three-point hitch is disposed in a horizontal plane behind the tractor and in which the third articulated arm for the third point of the hitch is disposed above the axis of pivot of the U-shaped yoke member with the articulated arms causing rotation of the yoke member with the tines thereon.